United States Patent
Yahia et al.

(10) Patent No.: US 12,023,994 B2
(45) Date of Patent: Jul. 2, 2024

(54) MOTOR VEHICLE AIR-CONDITIONING CIRCUIT AND RELATED MANAGEMENT METHOD

(71) Applicant: Valeo Systemes Thermiques, Le Mesnil Saint-Denis (FR)

(72) Inventors: Mohamed Yahia, Le Mesnil Saint-Denis (FR); Bertrand Nicolas, Le Mesnil Saint-Denis (FR)

(73) Assignee: VALEO SYSTEMES THERMIQUES, Le Mesnil Saint-Denis (FR)

( * ) Notice: Subject to any disclaimer, the term of this patent is extended or adjusted under 35 U.S.C. 154(b) by 400 days.

(21) Appl. No.: 17/425,108

(22) PCT Filed: Jan. 22, 2020

(86) PCT No.: PCT/FR2020/050082
§ 371 (c)(1),
(2) Date: Jul. 22, 2021

(87) PCT Pub. No.: WO2020/152420
PCT Pub. Date: Jul. 30, 2020

(65) Prior Publication Data
US 2022/0105784 A1 Apr. 7, 2022

(30) Foreign Application Priority Data
Jan. 25, 2019 (FR) ...................................... 1900687

(51) Int. Cl.
*B60H 1/32* (2006.01)
*B60H 1/00* (2006.01)
(52) U.S. Cl.
CPC ......... *B60H 1/323* (2013.01); *B60H 1/00485* (2013.01); *B60H 1/3227* (2013.01); *B60H 1/32284* (2019.05)

(58) Field of Classification Search
CPC .. B60H 1/323; B60H 1/3227; B60H 1/32284; B60H 1/00485; F25B 41/39;
(Continued)

(56) References Cited

U.S. PATENT DOCUMENTS

2017/0203635 A1* 7/2017 Kuroda .............. B60H 1/00342

FOREIGN PATENT DOCUMENTS

| FR | 3026478 A1 | 4/2016 |
| FR | 3036744 A1 | 12/2016 |
| WO | 2017/212158 A1 | 12/2017 |

OTHER PUBLICATIONS

International Search Report with Written Opinion in corresponding International Application No. PCT/FR2020/050082, mailed Mar. 31, 2020 (10 pages).

\* cited by examiner

*Primary Examiner* — Marc E Norman
(74) *Attorney, Agent, or Firm* — Osha Bergman Watanabe & Burton LLP

(57) ABSTRACT

The present invention relates to a reversible air-conditioning circuit (1) comprising: • a main loop (A) comprising a compressor (3) and a water condenser (5) jointly connected to an auxiliary circuit, a first expansion device (7), an external evaporator-condenser (9), a second expansion device (15), and an evaporator (17), • a first bypass branch (B) comprising an internal condenser (13), the first bypass branch (B) connecting a first junction point (31) arranged downstream from the water condenser (5) to a second junction point (32) arranged upstream from the second expansion device (15), • a second bypass branch (C) connecting a third junction point (33) arranged downstream from the external evaporator-condenser (9) to a fourth junction point (34) arranged downstream from the evaporator (17), and • a third bypass branch (D) connecting a fifth
(Continued)

Figure 1:
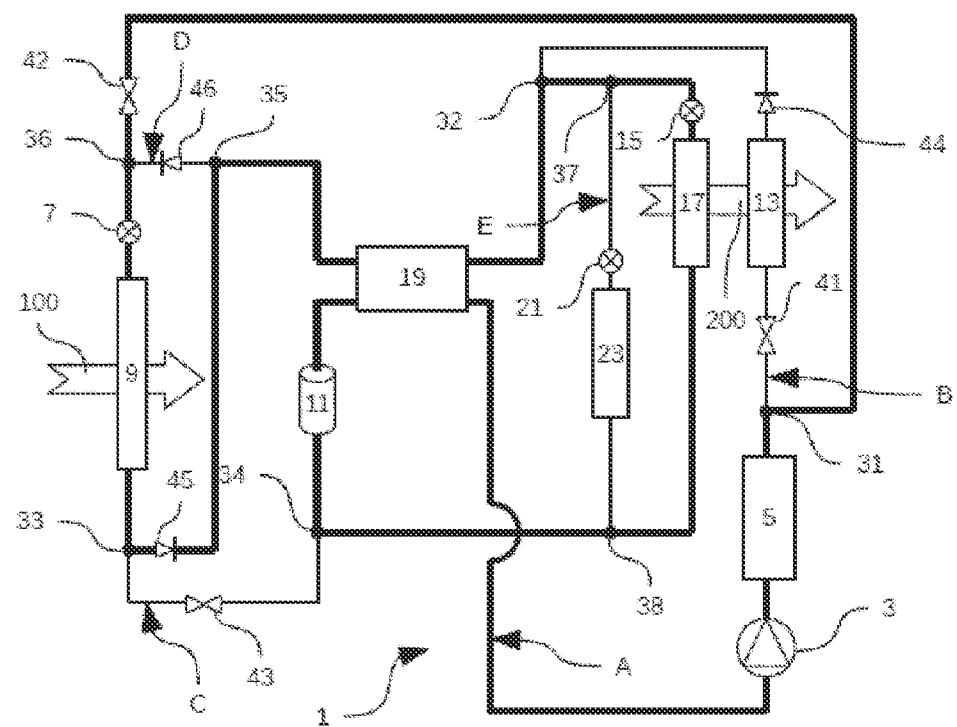

junction point (35) arranged downstream from the third junction point (33) to a sixth junction point (36) arranged downstream from the first junction point (31).

9 Claims, 8 Drawing Sheets

(58) Field of Classification Search
CPC ........ F25B 2339/047; F25B 2400/0403; F25B 2400/0409; F25B 2400/0411
See application file for complete search history.

MOTOR VEHICLE AIR-CONDITIONING CIRCUIT AND RELATED MANAGEMENT METHOD

The invention relates to the field of motor vehicles and more particularly to a motor vehicle air-conditioning circuit and to the method for managing same.

Present-day motor vehicles increasingly include an air-conditioning circuit. In general, in a "conventional" air-conditioning circuit, a refrigerant passes successively through a compressor, a first heat exchanger, referred to as a condenser, placed in contact with a flow of air external to the motor vehicle in order to release heat, an expansion device and a second heat exchanger, referred to as an evaporator, placed in contact with a flow of air internal to the motor vehicle in order to cool same.

There are also more complicated air-conditioning circuit architectures that make it possible to obtain a reversible air-conditioning circuit, i.e. one that can use a heat pump operating mode in which it is able to absorb heat energy from the external air at the first heat exchanger, then known as an evaporator-condenser, and release it into the passenger compartment, in particular by means of a dedicated third heat exchanger.

This is possible in particular using a dedicated internal condenser arranged in the internal air flow, which allows heating of said internal air flow.

The air-conditioning circuit thus comprises a particular architecture that makes it possible to choose which heat exchanger the refrigerant passes through in order to define the operating mode thereof.

The air-conditioning circuit can also be connected to an auxiliary circuit in which a heat-transfer fluid circulates. This auxiliary circuit can for example allow the thermal management of batteries and/or electric motors, in particular in a hybrid or electric motor vehicle. The air-conditioning circuit can thus be used, for example, to heat the heat-transfer fluid via a dedicated two-fluid heat exchanger referred to as a water condenser, or to cool the heat-transfer fluid via another two-fluid heat exchanger, also referred to as a cooler.

However, such architectures are not always satisfactory as they do not allow operation in all of the operating modes required by manufacturers.

One of the aims of the present invention is therefore to at least partially overcome the drawbacks of the prior art and propose an architecture allowing multiple operating modes on order to meet manufacturers' requirements and users' needs.

The present invention relates to a reversible air-conditioning circuit in which a refrigerant circulates and that includes:
- a main loop including, in the direction of circulation of the refrigerant, a compressor, a water condenser jointly connected to an auxiliary circuit in which a heat-transfer fluid circulates, a first expansion device, an external evaporator-condenser suitable for being passed through by an external air flow, a second expansion device, and an evaporator suitable for being passed through by an internal air flow,
- a first bypass branch including an internal condenser suitable for being passed through by an internal air flow, said first bypass branch connecting a first junction point arranged downstream of the water condenser, between said condenser and the first expansion device, to a second junction point arranged upstream of the second expansion device, between the external evaporator-condenser and said second expansion device,
- a second bypass branch connecting a third junction point arranged downstream of the external evaporator-condenser, between said external evaporator-condenser and the second junction point, to a fourth junction point arranged downstream of the evaporator, between said evaporator and the compressor, and
- a third bypass branch connecting a fifth junction point arranged downstream of the third junction point, between said third junction point and the second junction point, to a sixth junction point arranged downstream of the first junction point, between said first junction point and the first expansion device.

According to one aspect of the invention, the main loop includes an internal heat exchanger configured to allow heat exchanges between the refrigerant at separate pressures, said internal heat exchanger being arranged both between the fifth and second junction points and between the fourth junction point and the compressor.

According to another aspect of the invention, the reversible air-conditioning circuit is configured to operate in a first cooling mode in which the refrigerant circulates successively in the compressor, the water condenser, the first expansion device, through which it passes without a pressure drop, the external evaporator-condenser, where the refrigerant transfers heat energy to the external air flow, the second expansion device, where the refrigerant experiences a pressure drop, and the evaporator, where the refrigerant absorbs heat energy from the internal air flow before returning to the compressor.

According to another aspect of the invention, the reversible air-conditioning circuit is configured to operate in a first heat pump mode in which the refrigerant circulates successively in the compressor, the water condenser, and the first bypass branch, where the refrigerant transfers heat energy to the internal air flow via the internal condenser; the refrigerant then passes through the third bypass branch, the first expansion device, where it experiences a pressure drop, and the external evaporator-condenser, where the refrigerant absorbs heat energy from the external air flow: the refrigerant then passes through the second bypass branch before returning to the compressor.

According to another aspect of the invention, the reversible air-conditioning circuit is configured to operate in a second heat pump mode in which the refrigerant circulates successively in the compressor, the water condenser, where the refrigerant transfers heat energy to the heat-transfer fluid of the auxiliary circuit, the first expansion device, where the refrigerant experiences a pressure drop, and the external evaporator-condenser, where the refrigerant absorbs heat energy from the external air flow: the refrigerant then passes through the second bypass branch before returning to the compressor.

According to another aspect of the invention, the reversible air-conditioning circuit is configured to operate in a dehumidification mode in which the refrigerant circulates successively in the compressor, the water condenser, and the first bypass branch, where the refrigerant transfers heat energy to the internal air flow via the internal condenser; the refrigerant then divides at the second junction point:
- a first portion of the refrigerant passes through the third bypass branch, the first expansion device, where the refrigerant experiences a pressure drop, the external evaporator-condenser, where it absorbs heat energy from the external air flow, and the second bypass branch, and a second portion of the refrigerant passes through the second expansion device, where the refrigerant experiences a pressure drop, and through the evaporator, where the refrigerant absorbs heat energy from the internal air flow, two portions of the refrigerant meeting at the fourth junction point before returning to the compressor.

According to another aspect of the invention, the reversible air-conditioning circuit further comprises a fourth bypass branch including, in the direction of circulation of the refrigerant, a third expansion device and a cooler jointly connected to a heat-transfer fluid circuit, said fourth bypass branch connecting a seventh junction point arranged downstream of the second junction point, between said second junction point and the second expansion device, to an eighth junction point arranged downstream of the evaporator, between said evaporator and the fourth junction point.

According to another aspect of the invention, the reversible air-conditioning circuit is configured to operate in a second cooling mode in which the refrigerant circulates successively in the compressor, the water condenser, the first expansion device, through which it passes without a pressure drop, and the external evaporator-condenser, where the refrigerant transfers heat energy to the external air flow, the refrigerant dividing at the seventh junction point:

a first portion of the refrigerant passing through the second expansion device, where the refrigerant experiences a pressure drop, and the evaporator, where the refrigerant absorbs heat energy from the internal air flow, and a second portion of the refrigerant passing through the third expansion device, where the refrigerant experiences a pressure drop, and the cooler, where the refrigerant absorbs heat energy from the heat-transfer fluid of the auxiliary circuit, the two portions of the refrigerant meeting at the eighth junction point before returning to the compressor.

According to another aspect of the invention, the reversible air-conditioning circuit is configured to operate in a de-icing mode in which the refrigerant circulates successively in the compressor, the water condenser, where the refrigerant transfers heat energy to the heat-transfer fluid of the auxiliary circuit, the first expansion device, where the refrigerant experiences a pressure drop, and the external evaporator-condenser, where the refrigerant transfers heat energy for de-icing; on leaving the external evaporator-condenser, the refrigerant passes through the seventh junction point before going, as required, to the second expansion device and/or to the fourth bypass branch:

passing through the second expansion device, where the refrigerant experiences a second pressure drop, and the evaporator, where the refrigerant absorbs heat energy from the internal air flow, and passing through the third expansion device, where the refrigerant experiences a second pressure drop, and the cooler, where the refrigerant absorbs heat energy from the heat-transfer fluid of the auxiliary circuit, the refrigerant then returns to the compressor.

According to another aspect of the invention, the reversible air-conditioning circuit is configured to operate in a cold start mode in which the refrigerant circulates successively in the compressor, the water condenser, where the refrigerant transfers heat energy to the heat-transfer fluid of the auxiliary circuit, the first expansion device, where the refrigerant experiences a pressure drop, and the external evaporator-condenser, through which the refrigerant passes with little or no loss of heat energy; the refrigerant then passes into the third expansion device, through which the refrigerant passes without a pressure drop, and the cooler, where the refrigerant absorbs heat energy from the heat-transfer fluid of the auxiliary circuit; the refrigerant then returns to the compressor.

Figure 2A:
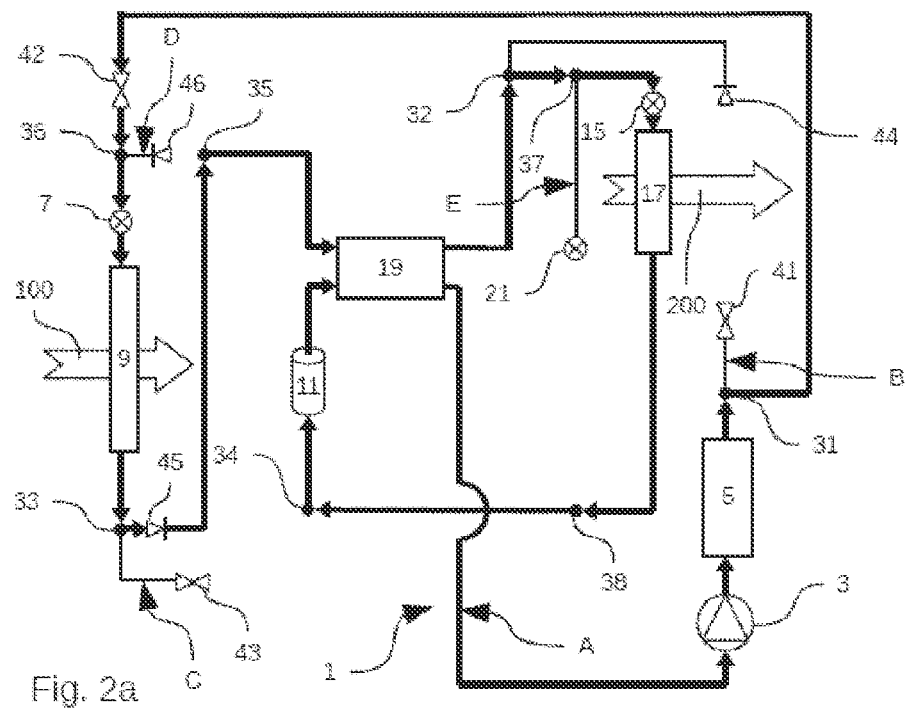
Figure 2B:
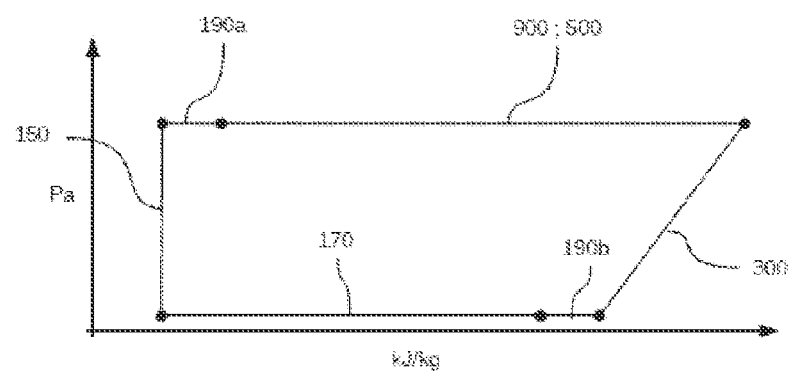
Figures 3A, 3B:
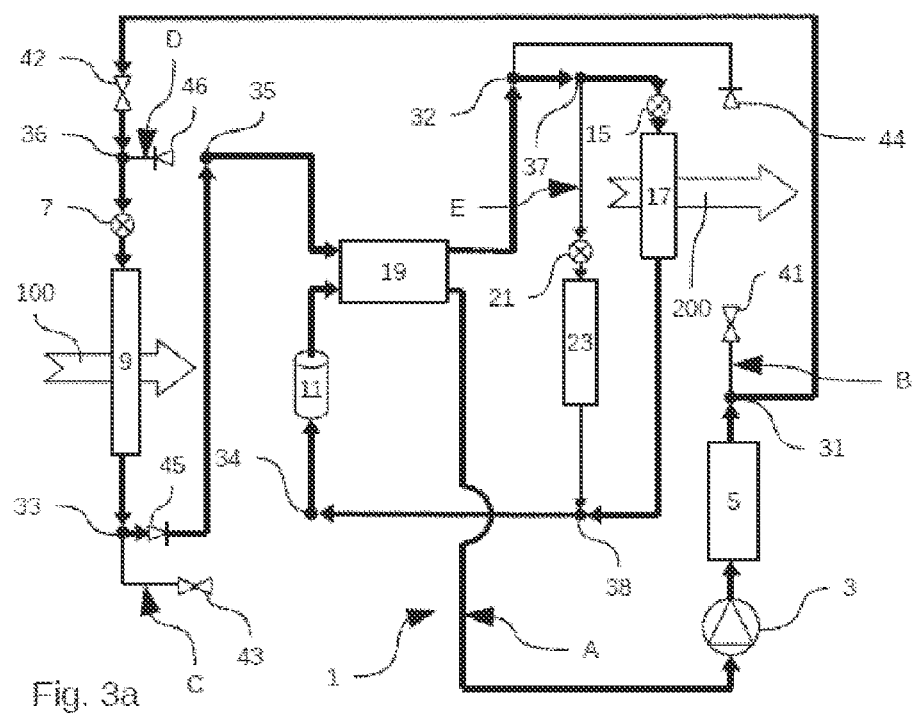
Figure 4A:
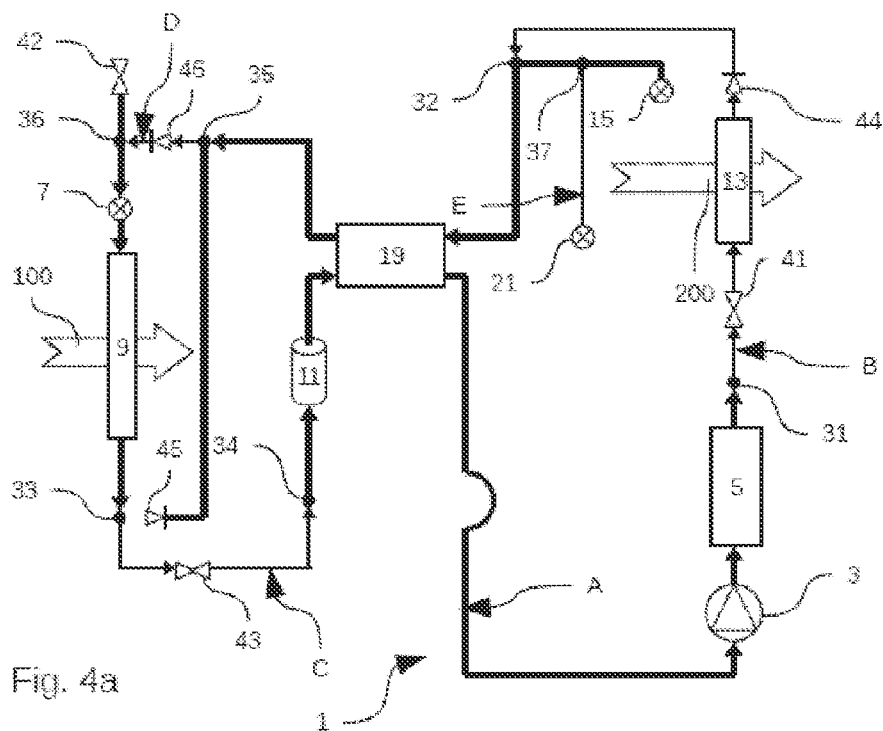
Figure 4B:
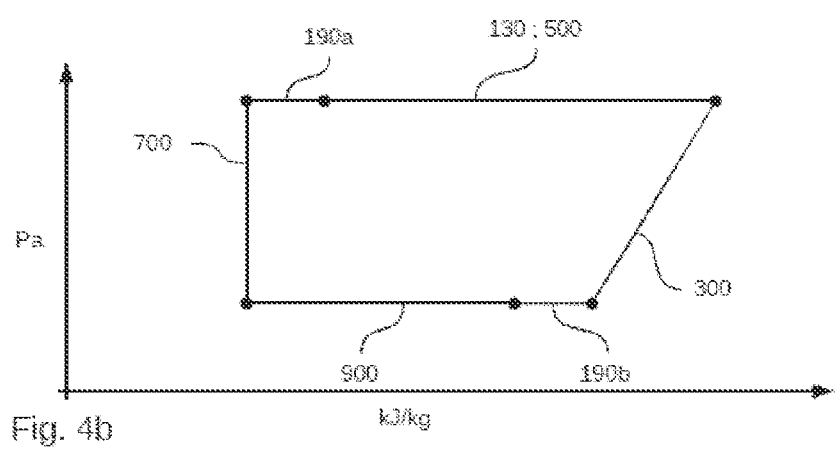
Figure 5A:
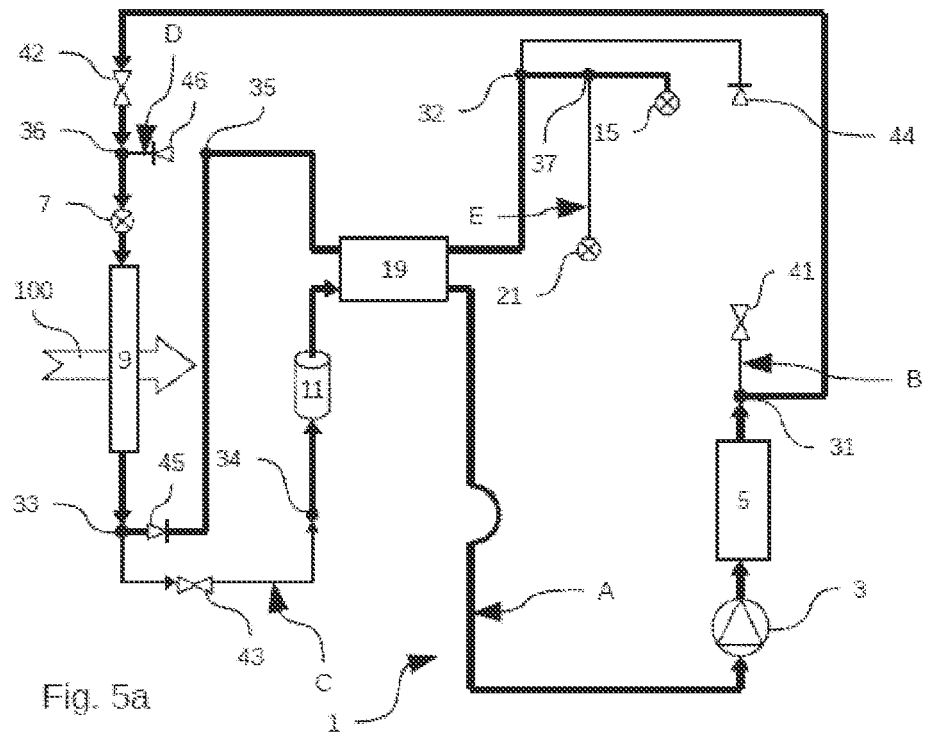
Figure 5B:
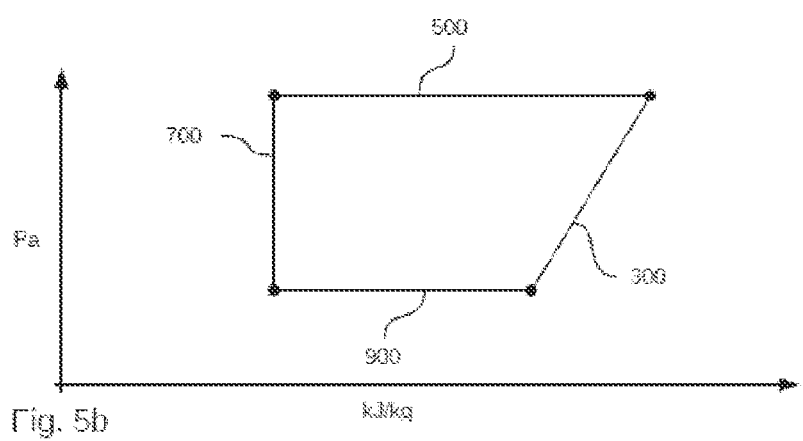
Figure 6A:
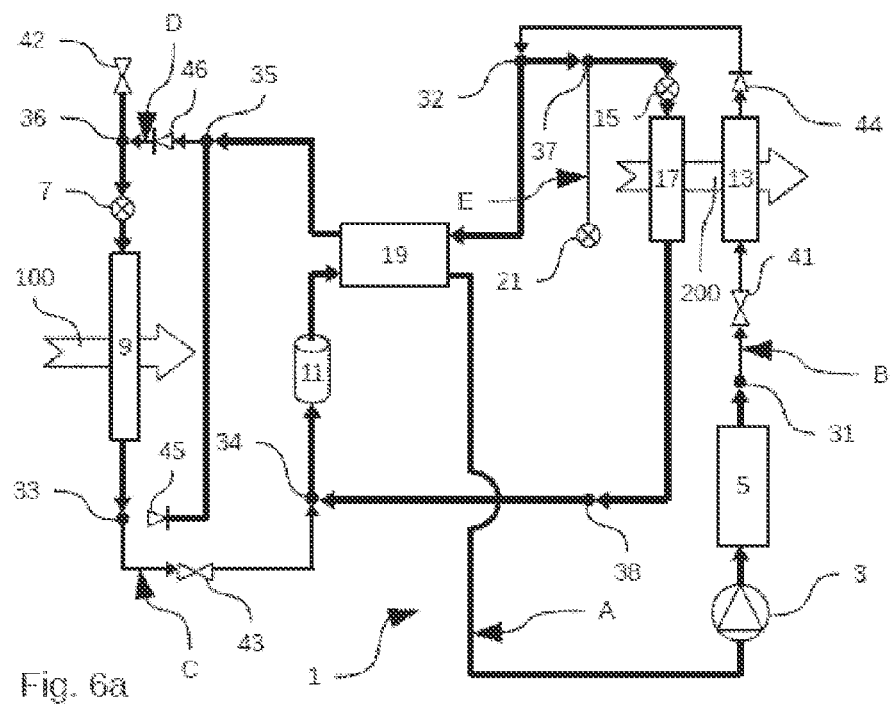
Figure 6B:
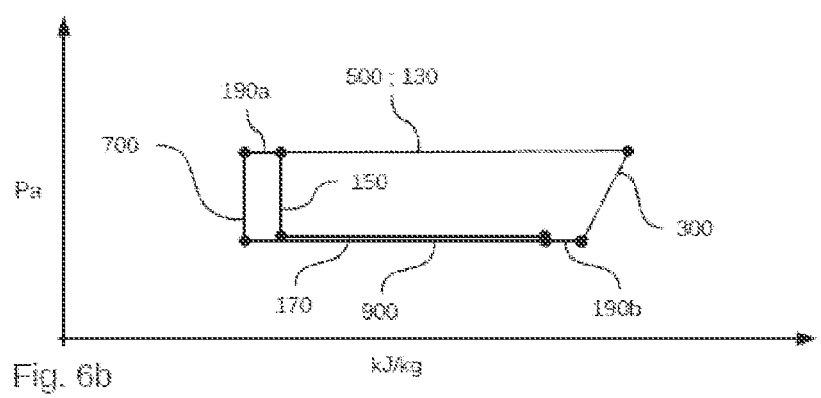
Figure 7A:
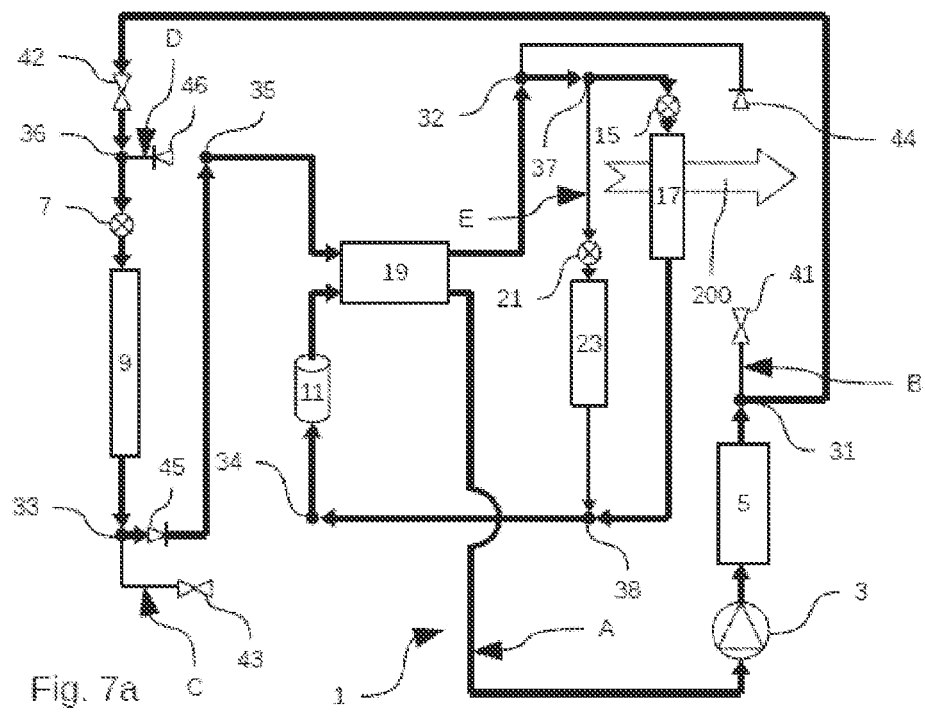

Further features and advantages of the invention will become more clearly apparent on reading the following description, which is given by way of non-limiting illustrative example, and from the appended drawings in which:

FIG. 1 is a schematic depiction of a reversible air-conditioning circuit,

FIG. 2a is a schematic depiction of a reversible air-conditioning circuit according to a first operating mode, FIG. 2b is a schematic depiction of a pressure/enthalpy diagram of the first operating mode in FIG. 2a, FIG. 3a is a schematic depiction of a reversible air-conditioning circuit according to a second operating mode, FIG. 3b is a schematic depiction of a pressure/enthalpy diagram of the second operating mode in FIG. 3a, FIG. 4a is a schematic depiction of a reversible air-conditioning circuit according to a third operating mode, FIG. 4b is a schematic depiction of a pressure/enthalpy diagram of the third operating mode in FIG. 4a, FIG. 5a is a schematic depiction of a reversible air-conditioning circuit according to a fourth operating mode, FIG. 5b is a schematic depiction of a pressure/enthalpy diagram of the fourth operating mode in FIG. 5a, FIG. 6a is a schematic depiction of a reversible air-conditioning circuit according to a fifth operating mode, FIG. 6b is a schematic depiction of a pressure/enthalpy diagram of the fifth operating mode in FIG. 6a, FIG. 7a is a schematic depiction of a reversible air-conditioning circuit according to a sixth operating mode.

Figure 7B:
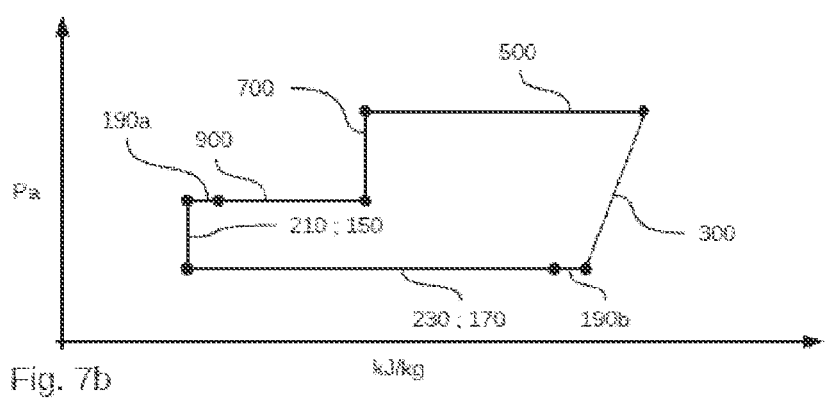
Figure 8A:
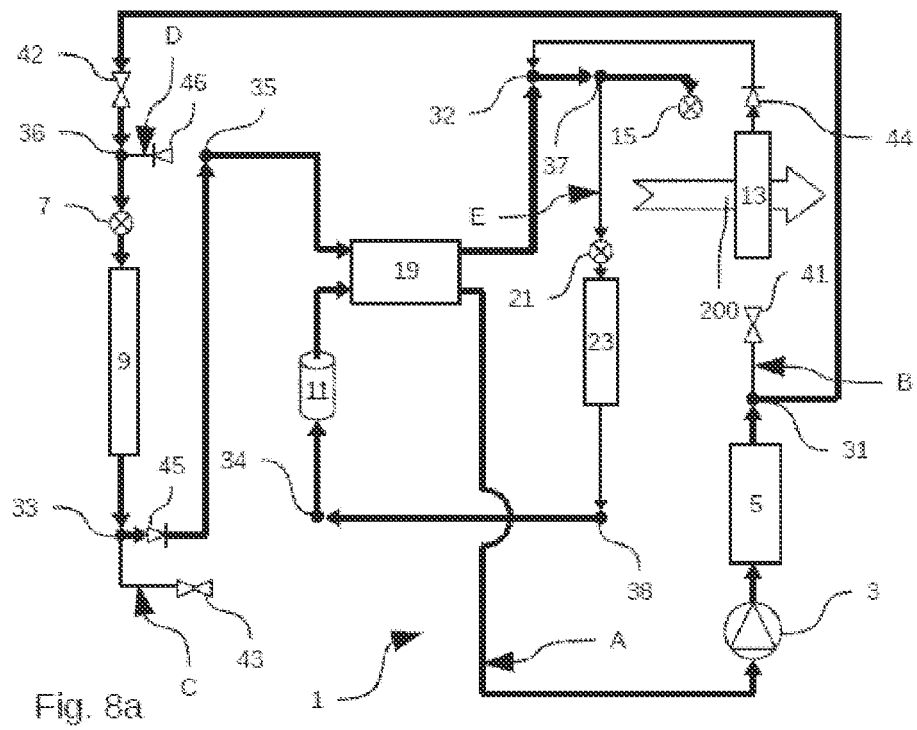
Figure 8B:
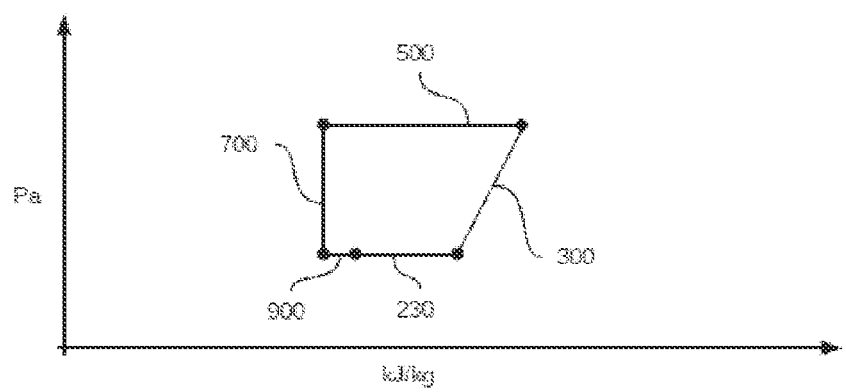

FIG. 7b is a schematic depiction of a pressure/enthalpy diagram of the sixth operating mode in FIG. 7a, FIG. 8a is a schematic depiction of a reversible air-conditioning circuit according to a seventh operating mode, FIG. 8b is a schematic depiction of a pressure/enthalpy diagram of the seventh operating mode in FIG. 8a.

In the various figures, identical elements bear the same reference numbers.

The following embodiments are examples. Although the description refers to one or more embodiments, this does not necessarily mean that each reference relates to the same embodiment, or that the features apply only to one embodiment. Single features of different embodiments can also be combined and/or interchanged in order to create other embodiments.

In the present description, some elements or parameters can be indexed, such as, for example, first element or second element, as well as first parameter and second parameter or even first criterion and second criterion, etc. In this case, this is simple indexing for differentiating and denoting elements or parameters or criteria that are similar but not identical. This indexing does not imply any priority of one element, parameter or criterion over another and such denominations can be easily interchanged without departing from the scope of the present description. Furthermore, this indexing does not imply any chronological order, for example, in assessing any given criterion.

In the present description, "positioned upstream" is given to mean that an element is positioned before another with respect to the direction in which a fluid circulates. Conversely, "positioned downstream" is given to mean that an element is positioned after another with respect to the direction in which the fluid circulates.

FIG. 1 shows a reversible air-conditioning circuit 1 in which a refrigerant circulates and that includes a main loop A together with three bypass branches B, C and D.

The main loop A includes, in the direction of circulation of the refrigerant:
- a compressor 3,
- a water condenser 5 jointly connected to an auxiliary circuit in which a heat-transfer fluid circulates,
- a first expansion device 7,
- an external evaporator-condenser 9 suitable for being passed through by an external air flow 100,
- a second expansion device 15, and
- an evaporator 17 suitable for being passed through by an internal air flow 200.

This main loop A is a loop chosen arbitrarily in order to facilitate the description thereof. This main loop A corresponds to the path of the refrigerant in a reference cooling mode described hereinafter.

The first 7 and second 15 expansion devices can more particularly be expansion devices capable of allowing the passage of the refrigerant without a pressure drop. The second expansion device 15 can also have a stop function and make it possible to prevent the circulation of the refrigerant.

External air flow 100 is given more particularly to mean a flow of air originating from the outside of the vehicle. The external evaporator-condenser 9 can thus, for example, be arranged on the front face of the motor vehicle in the radiator grille.

Internal air flow 200 is given more particularly to mean a flow of air intended for the passenger compartment of a motor vehicle. The evaporator 17 can for example be arranged within a heating, ventilation and air conditioning (HVAC) device.

Auxiliary circuit is given to mean a circulation circuit in which a heat-transfer fluid, for example water or glycol water, circulates. This circuit can for example include different heat exchangers in order to allow the thermal management of batteries and/or electric motors for example, in particular in a hybrid or electric motor vehicle.

The first bypass branch B connects a first junction point 31 to a second junction point 32. The first junction point 31 is arranged downstream of the water condenser 5, between the condenser 5 and the first expansion device 7. The second junction point 32 is arranged upstream of the second expansion device 15, between the external evaporator-condenser 9 and the second expansion device 15.

The first bypass branch B includes in particular an internal condenser 13 suitable for being passed through by the internal air flow 200. This internal condenser 13 can in particular be positioned downstream of the evaporator 17 in the internal air flow 200.

The second bypass branch C connects a third junction point 33 to a fourth junction point 34. The third junction point 33 is arranged downstream of the external evaporator-condenser 9, between said external evaporator-condenser 9 and the second junction point 32. The fourth junction point 34 is positioned downstream of the evaporator 17, between said evaporator 17 and the compressor 3.

The third bypass branch D connects a fifth junction point 35 to a sixth junction point 36. The fifth junction point 35 is arranged downstream of the third junction point 33, between said third junction point 33 and the second junction point 32. The sixth junction point 36 is positioned downstream of the first junction point 31, between said first junction point 31 and the first expansion device 7.

In order to control and determine the path of the refrigerant, the reversible air-conditioning circuit 1 includes different means for controlling the flow of refrigerant.

In order to determine whether or not the refrigerant circulates in the first bypass branch B, the reversible air-conditioning circuit 1 can thus include a first stop valve 41 arranged on said first bypass branch B and a second stop valve 42 arranged on the main loop A, downstream of the first junction point 31, between said first junction point 31 and the sixth junction point 36.

The first bypass branch B can also include a non-return valve 44 arranged between the first stop valve 31 and the second junction point 34 in order to prevent the refrigerant from returning from the second junction point 32 to the first junction point 31.

The second bypass branch C can also include a third stop valve 43 in order to allow the refrigerant coming from the external evaporator-condenser 9 to pass through it, or to prevent it from doing so.

The main loop A can also include a non-return valve 45 arranged downstream of the external evaporator-condenser 9 between the third junction point 33 and the fifth junction point 35 in order to prevent the refrigerant from returning from the fifth junction point 35 to the third junction point 33.

The third bypass branch D can also include a non-return valve 46 in order to prevent the refrigerant from returning from the sixth junction point 36 to the fifth junction point 35.

The reversible air-conditioning circuit 1 can also include, on the main loop A, an internal heat exchanger 19. This internal heat exchanger 19 is in particular configured to allow heat exchanges between the refrigerant at separate pressures in different operating modes described hereinafter. This internal heat exchanger 19 is more particularly arranged both between the fifth 35 and second 32 junction points and between the fourth junction point 34 and the compressor 3.

The reversible air-conditioning circuit 1 can also include a refrigerant accumulator 11 for example arranged upstream of the compressor 3. More specifically, this accumulator 11 can be arranged downstream of the fourth junction point 34 between said fourth junction point 34 and the internal heat exchanger 19.

The reversible air-conditioning circuit 1 can further comprise a fourth bypass branch E. This fourth bypass branch E is connected parallel to the second expansion device 15 and the evaporator 17 and connects a seventh junction point 37 to an eighth junction point 38. The seventh junction point 37 is arranged downstream of the second junction point 32, between said second junction point 32 and the second expansion device 15. The eighth junction point 38 is positioned downstream of the evaporator 17, between said evaporator 17 and the fourth junction point 34.

The fourth bypass branch E includes, in the direction of circulation of the refrigerant, a third expansion device 21 and a cooler 23 jointly connected to a heat-transfer fluid circuit. The third expansion device 21 can more particularly be an expansion device capable of allowing the passage of the refrigerant without a pressure drop. The third expansion device 21 can also have a stop function and make it possible to prevent the circulation of the refrigerant.

The reversible air-conditioning circuit 1 can in particular operate in different operating modes illustrated in FIGS. 2a, 3a, 4a, 5a, 6a, 7a and 8a. In these figures, only the elements through which the heat-transfer fluid circulates have been depicted. In addition, arrows indicate the direction in which the heat-transfer fluid circulates.

a) First Cooling Mode:

The reversible air-conditioning circuit 1 can be configured to operate in a first cooling mode illustrated in FIG. 2a. FIG. 2b shows a pressure (expressed in Pascals, Pa)/enthalpy (expressed in kJ/kg) diagram of the change in pressure and enthalpy of the refrigerant as it circulates and when it passes through different elements.

In this first cooling mode, the refrigerant first passes into the compressor 3. In the compressor 3, the refrigerant experiences an increase in pressure and enthalpy, as illustrated by the curve 300 in the diagram in FIG. 2b.

The refrigerant then passes into the water condenser 5. If the water condenser 5 is operating, that is, if the heat-transfer fluid of the auxiliary circuit is also passing through it, the refrigerant can transfer heat energy to the heat-transfer fluid, as illustrated by the curve 500 in the diagram in FIG. 2b. This can make it possible for example to heat the batteries and/or the electric motor in conjunction with the auxiliary circuit so that they reach an optimum operating temperature. If the water condenser 5 is off, that is, if the heat-transfer fluid of the auxiliary circuit is not passing through it, the refrigerant passes through it without losing heat energy to the heat-transfer fluid.

The refrigerant then passes into the first expansion device 7, through which it passes without a pressure drop.

The refrigerant then passes into the external evaporator-condenser 9. In the external evaporator-condenser 9, the refrigerant transfers heat energy to the external air flow 100, as illustrated by the curve 900 in the diagram in FIG. 2b.

The refrigerant then passes into the second expansion device 15, where the refrigerant experiences a pressure drop, as illustrated by the curve 150 in the diagram in FIG. 2b.

The refrigerant then passes into the evaporator 17. In the evaporator 17, the refrigerant absorbs heat energy from the internal air flow 200, as illustrated by the curve 170 in the diagram in FIG. 2b.

The refrigerant then returns to the compressor 3, passing in particular through the accumulator 11.

In this first cooling mode, the presence of the internal heat exchanger 19 can make it possible to increase the performance coefficient of the reversible air-conditioning circuit 1. As shown in FIG. 2a and curves 190a and 190b in the diagram in FIG. 2b, the refrigerant leaving the external evaporator-condenser 9 transfers some of its enthalpy and therefore some of its heat energy to the refrigerant upstream of the compressor 3.

In order to allow this first cooling mode, the first 41 and third 43 stop valves are closed. The second stop valve 42 is open.

If the reversible air-conditioning circuit 1 includes a fourth bypass branch E, the third expansion device 21 is then closed in order to prevent the refrigerant from circulating in it.

This first cooling mode makes it possible to cool the internal air flow 200 by absorbing heat energy in the evaporator 17. This heat energy is transferred to the external air flow 100 in the external evaporator-condenser 9.

b) Second Cooling Mode:

The reversible air-conditioning circuit 1 can be configured to operate in a second cooling mode illustrated in FIG. 3a. FIG. 3b shows a pressure (expressed in Pascals, Pa)/enthalpy (expressed in kJ/kg) diagram of the change in pressure and enthalpy of the refrigerant as it circulates and when it passes through different elements.

This second cooling mode is identical to the first cooling mode, with the difference that the reversible air-conditioning circuit 1 includes a fourth bypass branch E inside which the refrigerant circulates parallel to the evaporator 17.

Thus, on leaving the external evaporator-condenser 9, the refrigerant divides at the seventh junction point 37.

A first portion of the refrigerant then passes through the second expansion device 15, where the refrigerant experiences a pressure drop, as illustrated by the curve 150 in the diagram in FIG. 3b. This first portion of the refrigerant then passes through the evaporator 17, where the refrigerant absorbs heat energy from the internal air flow 200, as illustrated by the curve 170 in the diagram in FIG. 3b.

A second portion of the refrigerant passes through the third expansion device 21, where the refrigerant experiences a pressure drop, as illustrated by the curve 210 in the diagram in FIG. 3b. This second portion of the refrigerant then passes through the cooler 23, where the refrigerant absorbs heat energy from the heat-transfer fluid of the auxiliary circuit, as illustrated by the curve 230 in the diagram in FIG. 3b.

The two portions of the refrigerant then meet at the eighth junction point 38 before returning to the compressor 3.

In order to allow this second cooling mode, the first 41 and third 43 stop valves are closed. The second stop valve 42 is open.

This second cooling mode makes it possible to cool the internal air flow 200 in the evaporator 17 and also to cool the heat-transfer fluid in the cooler 23. Cooling the heat-transfer fluid of the auxiliary circuit makes it possible, for example, to cool the batteries and/or the electric motor of a hybrid or electric vehicle.

c) First Heat Pump Mode:

The reversible air-conditioning circuit 1 can be configured to operate in a first heat pump mode illustrated in FIG. 4a. FIG. 4b shows a pressure (expressed in Pascals, Pa)/enthalpy (expressed in kJ/kg) diagram of the change in pressure and enthalpy of the refrigerant as it circulates and when it passes through different elements.

In this first heat pump mode, the refrigerant first passes into the compressor 3. In the compressor 3, the refrigerant experiences an increase in pressure and enthalpy, as illustrated by the curve 300 in the diagram in FIG. 4b.

The refrigerant then passes into the water condenser 5. If the water condenser 5 is operating, that is, if the heat-transfer fluid of the auxiliary circuit is also passing through it, the refrigerant can transfer heat energy to the heat-transfer fluid, as illustrated by the curve 500 in the diagram in FIG. 4b. This can make it possible for example to heat the batteries and/or the electric motor in conjunction with the auxiliary circuit so that they reach an optimum operating temperature. If the water condenser 5 is off, that is, if the heat-transfer fluid of the auxiliary circuit is not passing through it, the refrigerant passes through it without losing heat energy to the heat-transfer fluid.

The heat-transfer fluid then passes into the first bypass branch B, where the refrigerant transfers heat energy to the internal air flow 200 via the internal condenser 13, as illustrated by the curve 130 in the diagram in FIG. 4b.

The refrigerant then passes through the third bypass branch D, in order to reach the first expansion device 7. In the first expansion device 7, the refrigerant experiences a pressure drop, as illustrated by the curve 700 in the diagram in FIG. 4b.

The refrigerant then passes into the external evaporator-condenser 9. In the external evaporator-condenser 9, the refrigerant absorbs heat energy from the external air flow 100, as illustrated by the curve 900 in the diagram in FIG. 4b.

The refrigerant then passes through the second bypass branch C, before returning to the compressor 3, passing in particular through the accumulator 11.

In this first heat pump mode, the presence of the internal heat exchanger 19 can make it possible to increase the performance coefficient of the reversible air-conditioning circuit 1. As shown in FIG. 4*a* and curves 190*a* and 190*b* in the diagram in FIG. 4*b*, the refrigerant leaving the internal condenser 13 transfers some of its enthalpy and therefore some of its heat energy to the refrigerant downstream of the external evaporator-condenser 9.

In order to allow this first heat pump mode, the first 41 and third 43 stop valves are open. The second stop valve 42 is closed.

The second expansion device 15 is closed in order to prevent the refrigerant from circulating in the evaporator 13.

If the reversible air-conditioning circuit 1 includes a fourth bypass branch E, the third expansion device 21 is also closed in order to prevent the refrigerant from circulating in it.

This first heat pump mode makes it possible to heat the internal air flow 200 in the internal condenser 13, and optionally to heat the heat-transfer fluid in the water condenser 5, by drawing heat energy from the external air flow 100 in the evaporator-condenser 9.

d) Second Heat Pump Mode:

The reversible air-conditioning circuit 1 can be configured to operate in a second heat pump mode illustrated in FIG. 5*a*. FIG. 5*b* shows a pressure (expressed in Pascals, Pa)/enthalpy (expressed in kJ/kg) diagram of the change in pressure and enthalpy of the refrigerant as it circulates and when it passes through different elements.

In this second heat pump mode, the refrigerant first passes into the compressor 3. In the compressor 3, the refrigerant experiences an increase in pressure and enthalpy, as illustrated by the curve 300 in the diagram in FIG. 5*b*.

The refrigerant then passes into the water condenser 5, which is operating, that is, the heat-transfer fluid of the auxiliary circuit is also passing through it. The refrigerant then transfers heat energy to the heat-transfer fluid, as illustrated by the curve 500 in the diagram in FIG. 5*b*.

The refrigerant then passes through the first expansion device 7. In the first expansion device 7, the refrigerant experiences a pressure drop, as illustrated by the curve 700 in the diagram in FIG. 5*b*.

The refrigerant then passes into the external evaporator-condenser 9. In the external evaporator-condenser 9, the refrigerant absorbs heat energy from the external air flow 100, as illustrated by the curve 900 in the diagram in FIG. 5*b*.

The refrigerant then passes through the second bypass branch C, before returning to the compressor 3, passing in particular through the accumulator 11.

In this second heat pump mode, the presence of the internal heat exchanger 19 does not have an influence as only the refrigerant coming from the external evaporator-condenser 9 passes through it.

In order to allow this second heat pump mode, the second 42 and third 43 stop valves are open. The first stop valve 41 is closed.

The second expansion device 15 is closed in order to prevent the refrigerant from circulating in the evaporator 13.

If the reversible air-conditioning circuit 1 includes a fourth bypass branch E, the third expansion device 21 is also closed in order to prevent the refrigerant from circulating in it.

This second heat pump mode makes it possible to heat the heat-transfer fluid only in the water condenser 5, by drawing heat energy from the external air flow 100 in the evaporator-condenser 9.

e) Dehumidification Mode:

The reversible air-conditioning circuit 1 can be configured to operate in a dehumidification mode illustrated in FIG. 6*a*. FIG. 6*b* shows a pressure (expressed in Pascals, Pa)/enthalpy (expressed in kJ/kg) diagram of the change in pressure and enthalpy of the refrigerant as it circulates and when it passes through different elements.

In this dehumidification mode, the refrigerant first passes into the compressor 3. In the compressor 3, the refrigerant experiences an increase in pressure and enthalpy, as illustrated by the curve 300 in the diagram in FIG. 6*b*.

The refrigerant then passes into the water condenser 5. If the water condenser 5 is operating, that is, if the heat-transfer fluid of the auxiliary circuit is also passing through it, the refrigerant can transfer heat energy to the heat-transfer fluid, as illustrated by the curve 500 in the diagram in FIG. 6*b*. This can make it possible for example to heat the batteries and/or the electric motor in conjunction with the auxiliary circuit so that they reach an optimum operating temperature. If the water condenser 5 is off, that is, if the heat-transfer fluid of the auxiliary circuit is not passing through it, the refrigerant passes through it without losing heat energy to the heat-transfer fluid.

The heat-transfer fluid then passes into the first bypass branch B, where the refrigerant transfers heat energy to the internal air flow 200 via the internal condenser 13, as illustrated by the curve 130 in the diagram in FIG. 6*b*.

The refrigerant then divides at the second junction point 32.

A first portion of the refrigerant passes through the third bypass branch D, in order to reach the first expansion device 7. In the first expansion device 7, the refrigerant experiences a pressure drop, as illustrated by the curve 700 in the diagram in FIG. 6*d*.

The refrigerant then passes into the external evaporator-condenser 9, where it absorbs heat energy from the external air flow 100, as illustrated by the curve 900 in the diagram in FIG. 6*b*.

The refrigerant then passes into the second bypass branch C.

A second portion of the refrigerant passes through the second expansion device 15, where the refrigerant experiences a pressure drop, as illustrated by the curve 150 in the diagram in FIG. 6*b*.

The refrigerant then passes through the evaporator 17, where the refrigerant absorbs heat energy from the internal air flow 200, as illustrated by the curve 170 in the diagram in FIG. 6*b*.

The two portions of the refrigerant meet at the fourth junction point 34 before returning to the compressor 3, passing in particular through the accumulator 11.

In this dehumidification mode, the presence of the internal heat exchanger 19 can make it possible to increase the performance coefficient of the reversible air-conditioning circuit 1. As shown in FIG. 6*a* and curves 190*a* and 190*b* in the diagram in FIG. 6*b*, the first portion of the refrigerant leaving the second junction point 32 transfers some of its enthalpy and therefore some of its heat energy to the refrigerant downstream of the fourth junction point 34.

In order to allow this dehumidification mode, the first 41 and third 43 stop valves are open. The second stop valve 42 is closed. If the reversible air-conditioning circuit 1 includes a fourth bypass branch E, the third expansion device 21 is also closed in order to prevent the refrigerant from circulating in it.

This dehumidification mode makes it possible in particular to dehumidify the internal air flow 200 by cooling it in the evaporator 17 then heating it in the internal compressor 13. This dehumidification mode is particularly useful and effective for an exterior air temperature greater than 0° C.

f) De-Icing Mode:

The reversible air-conditioning circuit 1 can be configured to operate in a de-icing mode illustrated in FIG. 7a. FIG. 7b shows a pressure (expressed in Pascals. Pa)/enthalpy (expressed in kJ/kg) diagram of the change in pressure and enthalpy of the refrigerant as it circulates and when it passes through different elements.

In this dehumidification mode, the refrigerant first passes into the compressor 3. In the compressor 3, the refrigerant experiences an increase in pressure and enthalpy, as illustrated by the curve 300 in the diagram in FIG. 7b.

The refrigerant then passes into the water condenser 5, which is operating, that is, the heat-transfer fluid of the auxiliary circuit is also passing through it. The refrigerant then transfers heat energy to the heat-transfer fluid, as illustrated by the curve 500 in the diagram in FIG. 7b.

The refrigerant then passes through the first expansion device 7. In the first expansion device 7, the refrigerant experiences a first pressure drop, as illustrated by the curve 700 in the diagram in FIG. 7b.

The refrigerant then passes into the external evaporator-condenser 9. In the external evaporator-condenser 9, the refrigerant transfers heat energy to the external air flow 100, as illustrated by the curve 900 in the diagram in FIG. 7b. In the external evaporator-condenser 9, the external air flow 100 is more particularly stopped, that is, it does not pass through said external evaporator-condenser 9, for example by means of a front face closure device. The heat energy transferred in the external evaporator-condenser 9 is thus used to melt the ice present on said heat exchanger.

On leaving the external evaporator-condenser 9, the refrigerant passes through the seventh junction point 37 before going, as required, to the second expansion device 15 and/or to the fourth bypass branch E.

When it passes through the second expansion device 15, the refrigerant experiences a second pressure drop, as illustrated by the curve 150 in the diagram in FIG. 7b. The refrigerant then passes through the evaporator 17, where it absorbs heat energy from the internal air flow 200, as illustrated by the curve 170 in the diagram in FIG. 7b.

When it passes through the third expansion device 21, the refrigerant also experiences a second pressure drop, as illustrated by the curve 210 in the diagram in FIG. 7b. The refrigerant then passes through the cooler 23, where the refrigerant absorbs heat energy from the heat-transfer fluid of the auxiliary circuit, as illustrated by the curve 230 in the diagram in FIG. 7b.

The refrigerant then returns to the compressor 3, passing in particular through the accumulator 11.

In this de-icing mode, the presence of the internal heat exchanger 19 can make it possible to increase the performance coefficient of the reversible air-conditioning circuit 1. As shown in FIG. 7a and curves 190a and 190b in the diagram in FIG. 7b, the refrigerant leaving the external evaporator-condenser 9 transfers some of its enthalpy and therefore some of its heat energy to the refrigerant upstream of the compressor 3.

In order to allow this de-icing mode, the first 41 and third 43 stop valves are closed. The second stop valve 42 is open.

In order for the refrigerant to pass through the evaporator 17 only, the third expansion device 21 is closed.

In order for the refrigerant to pass through the fourth bypass branch E only, the second expansion device 15 is closed.

This first de-icing mode makes it possible to defrost the ice formed on the external evaporator-condenser 9, for example during operation in heat pump mode, by absorbing heat energy from the internal air flow 100 in the evaporator 17 and/or absorbing heat energy from the heat-transfer fluid of the auxiliary circuit in the cooler 23.

g) Cold Start Mode:

The reversible air-conditioning circuit 1 can be configured to operate in a cold start mode illustrated in FIG. 8a. FIG. 8b shows a pressure (expressed in Pascals, Pa)/enthalpy (expressed in kJ/kg) diagram of the change in pressure and enthalpy of the refrigerant as it circulates and when it passes through different elements.

In this cold start mode, the refrigerant first passes into the compressor 3. In the compressor 3, the refrigerant experiences an increase in pressure and enthalpy, as illustrated by the curve 300 in the diagram in FIG. 8b.

The refrigerant then passes into the water condenser 5, which is operating, that is, the heat-transfer fluid of the auxiliary circuit is also passing through it. The refrigerant then transfers heat energy to the heat-transfer fluid, as illustrated by the curve 500 in the diagram in FIG. 8b.

The refrigerant then passes through the first expansion device 7. In the first expansion device 7, the refrigerant experiences a pressure drop, as illustrated by the curve 700 in the diagram in FIG. 8b.

The refrigerant then passes into the external evaporator-condenser 9. In the external evaporator-condenser 9, the refrigerant loses little or no heat energy to the external air flow 100, as illustrated by the curve 900 in the diagram in FIG. 8b. The external air flow 100 is stopped, that is, it does not pass through the external evaporator-condenser 9, for example by means of a front face closure device.

The refrigerant then passes into the fourth bypass branch E and passes through the third expansion device 21, through which it passes without a pressure drop.

The refrigerant then passes through the cooler 23. In the cooler 23, the refrigerant absorbs heat energy from the heat-transfer fluid of the auxiliary circuit, as illustrated by the curve 230 in the diagram in FIG. 8b.

The refrigerant then returns to the compressor 3.

In this cold start mode, the presence of the internal heat exchanger 19 has no effect as the refrigerant passing through said internal heat exchanger 19 on leaving the external evaporator-condenser 9 and the refrigerant arriving at the compressor 3 are at substantially the same pressure, preventing enthalpy exchanges between them.

In order to allow this cold start mode, the first 41 and third 43 stop valves are closed. The second stop valve 42 is open.

In order for the refrigerant to pass through the fourth bypass branch E, the second expansion device 15 is closed.

This cold start mode makes it possible, on a cold start of the motor vehicle, that is, in which all of the elements and fluids of the motor vehicle are at a temperature close or equal to ambient temperature, to rapidly increase the pressure of the refrigerant with the aim of subsequently switching to a cooling mode.

This cold start mode also makes it possible to limit the pressure inside the internal condenser 13 through a phenomenon of suction of the refrigerant illustrated by the arrows in FIG. 8a. This thus makes it possible to limit the pressure inside said internal condenser 13 in the cooling mode following said cold start mode.

For a chemical or organic refrigerant such as R134a, in a cooling mode, high pressure is of the order of 5 to 26 bar. Here, high pressure is given to mean the pressure of the refrigerant downstream of the compressor 3, between said compressor 3 and the second 15 and/or third 21 expansion device, where it experiences a pressure drop. Low pressure is of the order of 3 to 4 bar. Here, low pressure is given to mean the pressure upstream of the compressor 3, between the second 15 and/or the third 21 expansion device and said compressor 3. The pressure inside the internal condenser 13 is limited to between 2 and 5 bar.

For an inorganic refrigerant such as R744, in a cooling mode, high pressure is of the order of 50 to 130 bar. Low pressure is of the order of 35 to 55 bar. The pressure inside the internal condenser 13 is limited to between 25 and 35 bar.

It is thus clear that the architecture of the reversible air-conditioning circuit 1 according to the invention allows operation in multiple operating modes that are able to meet manufacturers' requirements and users' needs.

The invention claimed is:

1. A reversible air-conditioning circuit in which a refrigerant circulates, comprising:
   a main loop including, in a direction of circulation of the refrigerant, a compressor, a water condenser jointly connected to an auxiliary circuit in which a heat-transfer fluid circulates, a first expansion device, an external evaporator-condenser for being passed through by an external air flow, a second expansion device, and an evaporator for being passed through by an internal air flow;
   a first bypass branch including an internal condenser for being passed through by an internal air flow, said first bypass branch connecting a first junction point arranged downstream of the water condenser, between said water condenser and the first expansion device, to a second junction point arranged upstream of the second expansion device, between the external evaporator-condenser and said second expansion device;
   a second bypass branch connecting a third junction point arranged downstream of the external evaporator-condenser, between said external evaporator-condenser and the second junction point, to a fourth junction point arranged downstream of the evaporator, between said evaporator and the compressor;
   a third bypass branch connecting a fifth junction point arranged downstream of the third junction point, between said third junction point and the second junction point, to a sixth junction point arranged downstream of the first junction point, between said first junction point and the first expansion device;
   wherein the circuit is configured to operate in a first heat pump mode in which:
      the refrigerant circulates successively in the compressor, the water condenser, and the first bypass branch, where the refrigerant transfers heat energy to the internal air flow via the internal condenser,
      the refrigerant then passes through the third bypass branch, the first expansion device, where it experiences a pressure drop, and the external evaporator-condenser, where the refrigerant absorbs heat energy from the external air flow, and
      the refrigerant then passes through the second bypass branch before returning to the compressor.

2. The reversible air-conditioning circuit as claimed in claim 1, wherein the main loop includes an internal heat exchanger configured to allow heat exchanges between the refrigerant at separate pressures, said internal heat exchanger being arranged both between the fifth and second junction points and between the fourth junction point and the compressor.

3. The reversible air-conditioning circuit as claimed in claim 1, wherein the circuit is configured to operate in a first cooling mode in which the refrigerant circulates successively in the compressor, the water condenser, the first expansion device, through which it passes without a pressure drop, the external evaporator-condenser, where the refrigerant transfers heat energy to the external air flow, the second expansion device, where the refrigerant experiences a pressure drop, and the evaporator, where the refrigerant absorbs heat energy from the internal air flow before returning to the compressor.

4. The reversible air-conditioning circuit as claimed in claim 1, wherein the circuit is configured to operate in a second heat pump mode in which the refrigerant circulates successively in the compressor, the water condenser, where the refrigerant transfers heat energy to the heat-transfer fluid of the auxiliary circuit, the first expansion device, where the refrigerant experiences a pressure drop, and the external evaporator-condenser, where the refrigerant absorbs heat energy from the external air flow, and then passes through the second bypass branch before returning to the compressor.

5. The reversible air-conditioning circuit as claimed in claim 1, wherein the circuit is configured to operate in a dehumidification mode in which the refrigerant circulates successively in the compressor, the water condenser, and the first bypass branch, where the refrigerant transfers heat energy to the internal air flow via the internal condenser, the refrigerant then divides at the second junction point, at which:
   a first portion of the refrigerant passes through the third bypass branch, the first expansion device, where the refrigerant experiences a pressure drop, the external evaporator-condenser, where it absorbs heat energy from the external air flow, and the second bypass branch, and
   a second portion of the refrigerant passes through the second expansion device, where the refrigerant experiences a pressure drop, and through the evaporator, where the refrigerant absorbs heat energy from the internal air flow,
   the two portions of the refrigerant meeting at the fourth junction point before returning to the compressor.

6. The reversible air-conditioning circuit as claimed in claim 1, further comprising: a fourth bypass branch including, in the direction of circulation of the refrigerant, a third expansion device and a cooler jointly connected to a heat-transfer fluid circuit, said fourth bypass branch connecting a seventh junction point arranged downstream of the second junction point, between said second junction point and the second expansion device, to an eighth junction point arranged downstream of the evaporator, between said evaporator and the fourth junction point.

7. The reversible air-conditioning circuit as claimed in claim 6, wherein the circuit is configured to operate in a second cooling mode in which the refrigerant circulates successively in the compressor, the water condenser, the first expansion device, through which it passes without a pressure drop, and the external evaporator-condenser, where the refrigerant transfers heat energy to the external air flow, the refrigerant dividing at the seventh junction point, at which:
- a first portion of the refrigerant passing through the second expansion device, where the refrigerant experiences a pressure drop, and the evaporator, where the refrigerant absorbs heat energy from the internal air flow, and
- a second portion of the refrigerant passing through the third expansion device, where the refrigerant experiences a pressure drop, and the cooler, where the refrigerant absorbs heat energy from the heat-transfer fluid of the auxiliary circuit,
- the two portions of the refrigerant meeting at the eighth junction point before returning to the compressor.

8. The reversible air-conditioning circuit as claimed in claim 6, wherein the circuit is configured to operate in a de-icing mode in which:
- the refrigerant circulates successively in the compressor, the water condenser, where the refrigerant transfers heat energy to the heat-transfer fluid of the auxiliary circuit, the first expansion device, where the refrigerant experiences a pressure drop, and the external evaporator-condenser, where the refrigerant transfers heat energy for de-icing,
- on leaving the external evaporator-condenser, the refrigerant passes through the seventh junction point before going, as required, to the second expansion device and/or to the fourth bypass branch:
  - passing through the second expansion device, where the refrigerant experiences a second pressure drop, and the evaporator, where the refrigerant absorbs heat energy from the internal air flow, and
  - passing through the third expansion device, where the refrigerant experiences a second pressure drop, and the cooler, where the refrigerant absorbs heat energy from the heat-transfer fluid of the auxiliary circuit,
- the refrigerant then returns to the compressor.

9. The reversible air-conditioning circuit as claimed in claim 6, wherein the circuit is configured to operate in a cold start mode in which:
- the refrigerant circulates successively in the compressor, the water condenser, where the refrigerant transfers heat energy to the heat-transfer fluid of the auxiliary circuit, the first expansion device, where the refrigerant experiences a pressure drop, and the external evaporator-condenser, through which the refrigerant passes with little or no loss of heat energy,
- the refrigerant then passes into the third expansion device, through which the refrigerant passes without a pressure drop, and the cooler, where the refrigerant absorbs heat energy from the heat-transfer fluid of the auxiliary circuit, the refrigerant then returns to the compressor.

* * * * *